(12) United States Patent
Choi et al.

(10) Patent No.: US 10,815,127 B2
(45) Date of Patent: Oct. 27, 2020

(54) METHOD FOR MANUFACTURING ACTIVATED CARBON

(71) Applicants: Hyundai Motor Company, Seoul (KR); Kia Motors Corporation, Seoul (KR); Korea Institute of Carbon Convergence Technology, Jeonju, Jeollabuk-do (KR)

(72) Inventors: Sung Won Choi, Seoul (KR); Doo Nam Moon, Gyeonggi-do (KR); Byung Joo Kim, Jeollabuk-do (KR); Hye Min Lee, Jeollabuk-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 142 days.

(21) Appl. No.: 15/988,471

(22) Filed: May 24, 2018

(65) Prior Publication Data
US 2019/0241437 A1    Aug. 8, 2019

(30) Foreign Application Priority Data
Feb. 2, 2018    (KR) .......... 10-2018-0013425

(51) Int. Cl.
*C01B 31/08*    (2006.01)
*C01B 32/336*    (2017.01)
*C01B 32/318*    (2017.01)
*C01B 32/324*    (2017.01)
*C01B 32/33*    (2017.01)

(52) U.S. Cl.
CPC .......... *C01B 32/336* (2017.08); *C01B 32/318* (2017.08); *C01B 32/324* (2017.08); *C01B 32/33* (2017.08)

(58) Field of Classification Search
CPC .................................................. C01B 32/336
See application file for complete search history.

(56) References Cited

U.S. PATENT DOCUMENTS

2012/0172216 A1 *   7/2012   Bohringer .......... B01J 20/28057
                                                          502/416

FOREIGN PATENT DOCUMENTS

KR    20140080910 A    7/2014

\* cited by examiner

*Primary Examiner* — Stuart L Hendrickson
(74) *Attorney, Agent, or Firm* — Mintz Levin Cohn Ferris Glovsky and Popeo, P.C.; Peter F. Corless

(57) ABSTRACT

Provided herein is a method for manufacturing activated carbon that providing a carbon material in a reactor, carbonizing the carbon material by a first heat-treating under an inert gas atmosphere, first activating the carbonized carbon material by a second heat-treating under an oxidizing gas atmosphere, and second activating the first activated material by a third heat-treating under a carbon dioxide atmosphere.

14 Claims, 3 Drawing Sheets

METHOD FOR MANUFACTURING ACTIVATED CARBON

CROSS-REFERENCE TO RELATED APPLICATION

This application claims priority to and the benefit of Korean Patent Application No. 10-2018-0013425 filed in the Korean Intellectual Property Office on Feb. 2, 2018, the entire contents of which are incorporated herein by reference.

TECHNICAL FIELD

The present invention is related to a method for manufacturing an activated carbon.

BACKGROUND

Recently, indoor comfort of a vehicle according to deterioration of an atmosphere environment has not only been increasingly required, but environment regulations also have been increasingly reinforced internationally over America, Europe, Korea, and the like. Accordingly, in order to improve the indoor atmosphere of a vehicle, development of a high quality canister including activated carbon having excellent gasoline vapor absorption/desorption characteristics has been demanded.

In the related art, activated carbon can be manufactured by a chemical activating method and a physical activating method. For example, the activated carbon used for a gasoline vapor catcher can be manufactured by the chemical activating method to obtain high adsorption performance. The chemical activating method may provide the activated carbon material with high pore characteristics compared with the physical activating method but costs high and requires a complex process including a washing process.

SUMMARY OF THE INVENTION

In preferred aspects, the present invention provides a method for manufacturing activated carbon having substantially improved pore characteristics and gasoline vapor adsorption/desorption performance.

In one aspect, a method for manufacturing activated carbon may include providing a carbon material in a reactor; carbonizing the carbon material by a first heat-treating under an inert gas atmosphere, first activating the carbonized carbon material by a second heat-treating under an oxidizing gas atmosphere and second activating the first activated carbon material by a third heat-treating under a carbon dioxide atmosphere.

The term "carbon material" or "carbon precursor" as used herein refers to a material that contains carbon as main content, e.g., greater than about 10 wt %, 20 wt %, 30 wt %, 40 wt %, 50 wt %, 60 wt %, 70 wt %, 80 wt %, or 90 wt %, based on the total weight. Preferably, by carbonizing, heat-treating or combustion, the carbon material or the carbon precursor may be a substantially pure, or elemental carbon substance. The term "activated carbon" as used herein is an elemental carbon material or substantially pure carbon material that is processed to have small, low-volume pores and increase the surface area available for gas or molecule adsorption or chemical reactions. Examples of the activated carbon may include micropores having a diameter less than 2 nm or mesopores having a diameter of 2 nm to 50 nm for the gas or molecule absorption.

The carbon material or the carbon precursor may include at least one selected from coal, starch, coconut shells, tangerine peels, orange peels, coffee grounds, bamboo stems, wood chips, petroleum-based pitch, coal-based pitch, a polyvinylidene-based polymer, a phenol-based polymer, a urethane-based polymer, and a polyacrylonitrile polymer.

The carbonizing may include the first heat-treating at a temperature of about 600° C. to about 1000° C. for about 1 hour to about 2 hours.

A temperature-increasing rate of the first heat-treating may suitably range from about 0.5° C./min to about 10° C./min.

After the carbonizing, the method may further include increasing a temperature under an inert gas atmosphere.

The first activating may include the second heat-treating at a temperature of about 600° C. to about 1100° C. for about 10 to about 60 minutes.

The oxidizing gas may suitably include at least one of steam and oxygen.

The second activating may include the third heat-treating at a temperature of about 900° C. to about 1200° C. for about 10 to about 60 minutes.

The second activating may include the third heat-treating performed at a temperature than a temperature of the second heat-treating by about 50 to about 300° C.

After the second activating, the method may further include cooling under an inert gas atmosphere.

After the second activating, the method may further include a reduction process by a fourth heat-treating under a reduction gas atmosphere.

The reduction process may include the fourth heat-treating at a temperature of about 200° C. to about 500° C. for about 10 to about 50 minutes.

The reduction gas may include at least one of hydrogen and ammonia.

The reduction gas may be included in an amount of about 1 to about 20 volume % of the total volume inside the reactor.

After the reduction process, the activated carbon may have an oxygen content of less than or equal to about 3.5 wt %.

Further provided is a vehicle that may include the activated carbon manufactured as described herein.

According to various exemplary embodiments of the present invention, the activated carbon having substantially improved pore characteristics and gasoline vapor adsorption/desorption performance may be prepared.

DETAILED DESCRIPTION OF THE EMBODIMENTS

Figure 1:
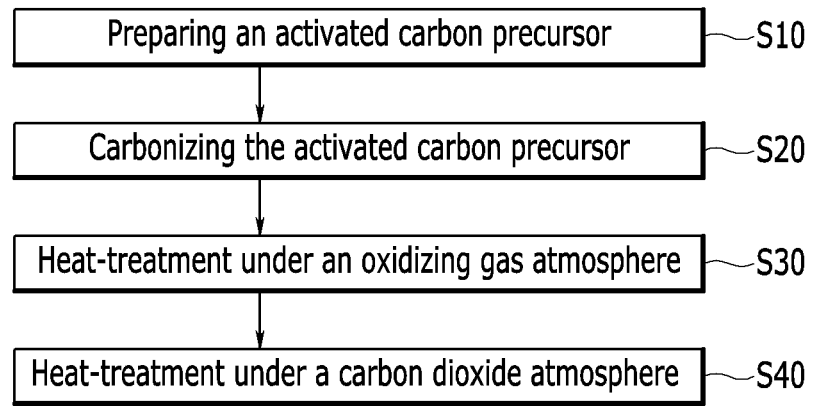
FIG. 1 is a schematic flowchart showing an exemplary method of manufacturing activated carbon according to an exemplary embodiment of the present invention.

Terms such as first, second, and third are used to illustrate various portions, components, regions, layers, and/or sections, but not to limit them. These terms are used to discriminate the portions, components, regions, layers, or sections from other portions, components, regions, layers, or sections. Therefore, a first portion, component, region, layer, or section as described below may be a second portion, component, region, layer, or section within the scope of the present invention.

It is to be understood that the terminology used therein is only for the purpose of describing particular embodiments and is not intended to be limiting. It must be noted that, as used in the specification and the appended claims, the singular forms include plural references unless the context clearly dictates otherwise. It will be further understood that the terms "comprises" and/or "comprising," when used in this specification, specify the presence of stated properties, regions, integers, steps, operations, elements, and/or components, but do not preclude the presence or addition of one or more other properties, regions, integers, steps, operations, elements, and/or components thereof.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

It will be understood that when an element is referred to as being "on" another element, it can be directly on the other element or intervening elements may also be present. In contrast, when an element is referred to as being "directly on" another element, there are no intervening elements present.

Unless it is mentioned otherwise, all terms including technical terms and scientific terms used herein have the same meaning as the meaning generally understood by a person with ordinary skill in the art to which the present invention belongs. The terminologies that are defined previously are further understood to have the meanings that coincide with related technical documents and the contents that are currently disclosed, but are not to be interpreted as having ideal or very official meanings unless defined otherwise.

Example embodiments of the present invention will be described more fully hereinafter with reference to the accompanying drawings so that a person skilled in the art of the present invention may easily implement the invention. As those skilled in the art would realize, the described embodiments may be modified in various different ways, all without departing from the spirit or scope of the present invention.

The present invention provides a method for manufacturing activated carbon that may have substantially improved pore characteristics and gasoline vapor adsorption/desorption performance.

FIG. 1 is a schematic flowchart showing an exemplary method of manufacturing activated carbon according to an exemplary embodiment of the present invention. The flowchart of FIG. 1 shows one exemplary embodiment of the present invention, but the present invention is not limited thereto. Accordingly, the method of manufacturing activated carbon may be variously modified.

As shown in FIG. 1, the method for manufacturing activated carbon according to an example embodiment of the present invention may include: providing a carbon material in a reactor (S10), carbonizing the carbon material by a first heat-treating under an inert gas atmosphere (S20), first activating the carbonized carbon material by a second heat-treating under an oxidizing gas atmosphere (S30), and second activating the first activated carbon material that is heat-treated under the oxidizing gas atmosphere by heat-treating the same under a carbon dioxide atmosphere (S40).

In one preferred aspect, an exemplary embodiment of the present invention may provide the activated carbon having substantially improved pore characteristics and gasoline vapor adsorption/desorption performance.

Hereinafter, each step of the manufacturing method is described in details.

First, in the step (S10), a carbon material, or alternatively, an activated carbon precursor may be prepared and provided in a reactor. Specifically, the activated carbon precursor may include at least one selected from coal, starch, coconut shells, tangerine peels, orange peels, coffee grounds, bamboo stems, wood chips, petroleum-based pitch, coal-based pitch, a polyvinylidene-based polymer, a phenol-based polymer, a urethane-based polymer, and a polyacrylonitrile polymer. However, the present invention is not limited thereto but may use various materials usable as an activated carbon precursor. For instance, low-price activated carbon may be manufactured by using an inexpensive vegetable material-based material as a precursor.

In addition, the activated carbon precursor may be a polyvinylidene-based polymer. Preferably, it may be at least one selected from the group consisting of poly(vinylidene fluoride), poly(vinylidene fluoride-co-hexafluoropropylene), poly(vinylidene chloride-co-acrylonitrile), poly(vinylidene chloride-co-acrylonitrile-co-methyl methacrylate, poly(vinylidene chloride-co-vinyl-chloride), and poly(vinylidenechloride-co-methyl acrylate).

Subsequently, a step of grinding the activated carbon precursor may be further included to produce the uniform carbon material. The grinding step may suitably be performed by using a ball mill, a ball used therein may be made of stainless steel (e.g, SUS) or zirconia ($ZrO_2$) but is not limited thereto.

After the grinding with the ball mill, a step of washing the precursor with acid to remove impurities may be further included. Herein, the acid may include hydrochloric acid, nitric acid, or sulfuric acid but is not limited thereto.

In addition, after the acid washing, the method may further include a step of sifting the uniformed activated carbon precursor with a sieve having a size of about 100 μm to 250 μm. Accordingly, activated carbon having a uniform particle size, a high specific surface area, and being free from impurities may be obtained. The particle size uniformity of activated carbon may play an important role in processing activated carbon applicable to an actual product. For example, when activated carbon is used for a water purifier filter, an air conditioner filter for a vehicle, a super capacitor electrode, or the like, the activated carbon may be mixed with a binder and thus transformed into a pellet or a granular. Herein, when the activated carbon has no uniform particle size, performance may be deteriorated. Preferably, when the precursor is sifted with a sieve having a size of about 100 μm to about 250 μm, appropriate uniformity may be obtained.

Subsequently, the activated carbon precursor may be heat-treated (second heat-treatment) and carbonized under an inert gas atmosphere in the step (S20). Herein, generally known inert gas in the related art may be used for the inert gas atmosphere without limitation. For instance, the inert gas may include nitrogen ($N_2$) or argon (Ar) but is not limited thereto.

A heat treatment for the carbonization may be performed at a temperature of about 600° C. to about 1000° C. for about 1 hour to about 2 hours. When the second heat-treating temperature is less than the predetermined range, e.g., less than about 600° C., or the second heat-treating time is less than the predetermined time, e.g., 1 hour, the carbonization may not be complete. Since the carbonization at about 600° C. to about 1000° C. for about 1 hour to about 2 hours is sufficient, the heat treatment may not need to be performed at a higher temperature or for longer time. In addition, a temperature greater than the predetermined range, e.g., greater than about 1000° C., may generate an unnecessary cost and decrease a carbonization yield. Preferably, the heat treatment for the carbonization may be performed at about 650° C. to about 800° C.

A temperature-increasing rate in the carbonization (second heat-treatment) may be about 0.5° C./min to about 10° C./min. When the temperature-increasing rate is less that the predetermined range, e.g., less than about 0.5° C./min, in the carbonization, the carbonization may not appropriately occur. When the carbonization sufficiently occurs at a temperature-increasing rate of about 0.5° C./min to about 10° C./min, the temperature-increasing rate may not be necessary.

After the step (S20), a step of increasing a temperature under an inert gas atmosphere may be further included. Since the inert gas is the same as above, a detailed description is omitted.

Subsequently, in the step (S30), the carbonized carbon precursor material may be heat-treated under an oxidizing gas atmosphere. In an exemplary embodiment of the present invention, the carbonized material may be first activated under the oxidizing gas atmosphere and then, second activated under a carbon dioxide atmosphere. In particular, the first activating and second activating may be separated and sequentially performed thereby providing substantially improved pore characteristics. When the first activating and second activating are separated and sequentially performed, the first activating and second activating may not simultaneously be performed, but when the first activating is complete, the second activating may be performed. For instance, the first activating may be performed under the oxidizing gas atmosphere including no carbon dioxide, and on the contrary, the second activating may be performed under the carbon dioxide gas atmosphere including no oxidizing gas.

Since the first activating and second activating use a different kind of atmosphere gas, different-shaped pore structures may be formed. Preferably, in the first activating, a pore having a relatively large diameter may be formed and developed from outside of the carbonized material. In addition, in the second activating, a pore having a smaller diameter than that of the first activating may be formed and developed from inside of the carbonized material.

The oxidizing gas may include any gas capable of applying an oxygen functional group to the carbonized material without a particular limit. For instance, at least one of steam ($H_2O$) and oxygen ($O_2$) may be included. Carbon dioxide may not be a gas that can supply an oxygen functional group to the carbonized material and thus not included in the oxidizing gas.

The first activating may be performed through a second heat treatment at a temperature of about 600° C. to about 1100° C. for about 10 to about 60 minutes. When the second heat-treatment temperature is less than the predetermined range, e.g., less than about 600° C., or the second heat-treatment time is less than the predetermined range, e.g., less than about 10 min, an appropriate pore may not be formed. When the second heat-treatment temperature is greater than the predetermined range, e.g., greater than about 1100° C., or the second heat-treatment time is greater than the predetermined range, e.g., 60 min, a pore having a greater diameter than a diameter which is advantageous for an adsorption may be formed, and in addition, a process may be difficult to control due to a fast oxidation reaction. Preferably, the first activating may be performed through a heat treatment at about 700° C. to about 1000° C.

The oxidizing gas may be supplied at a speed of about 0.1 to about 1 ml/min.

Then, in the step (S40), the carbonized material heat-treated under the oxidizing gas atmosphere may include a third heat-treatment under a carbon dioxide atmosphere. As aforementioned, the first activating and second activating in an example embodiment of the present invention may be separated and sequentially performed and thus substantially improved pore characteristics may be obtained.

The second activating may be performed through a heat treatment at a temperature of about 900° C. to about 1200° C. for about 10 to about 60 minutes. When the third heat-treating temperature is less than the predetermined range, e.g., less than about 900° C., or the third heat-treatment time is less than the predetermined range, e.g., less than about 10 minutes, an appropriate pore may not be formed. When the third heat-treatment temperature is greater than the predetermined range, e.g., greater than about 1200° C., or the third heat-treatment time is greater than the predetermined time, e.g., 60 minutes, a pore having a greater diameter than the diameter which is advantageous for an adsorption may be formed. In addition, a process may be difficult to control due to a fast oxidation reaction. Preferably, the second activating may be performed through a heat treatment at a temperature of about 950° C. to about 1100° C.

The second activating (third heat-treatment) may be performed though a heat treatment that may be greater than the temperature of the first activating (second heat-treatment) by about 50 to about 300° C. When the first activating and second activating are simultaneously performed, a heat treatment may be performed at the same temperature. In an example embodiment of the present invention, the heat treatment may be performed at the predetermined temperature required in each step by separately performing the first activating and second activating to substantially improve pore characteristics.

Carbon dioxide may be supplied at a speed of about 100 to about 300 ml/min.

After the second activating, the activated carbon may have a specific surface area of greater than or equal to about 1500 $m^2/g$. As a result, an exemplary method of manufacturing the activated carbon may provide activated carbon having excellent pore characteristics. Preferably, the activated carbon may have a specific surface area of greater than or equal to about 2000 m²/g. In particular, the activated carbon may have a specific surface area of greater than or equal to about 2500 m²/g.

After the step (S40), a step of cooling under an inert gas atmosphere may be further included.

After the step (S40), a reduction step of performing a heat treatment under a reduction gas atmosphere may be further included. The reduction step may further improve gasoline vapor adsorption/desorption performance of the activated carbon.

Herein, as for reduction gas, any gas capable of desorbing the oxygen functional group formed in the step (S30) may be used without limitation. Preferably, the reduction gas may include at least one of hydrogen and ammonia.

The reduction gas may be used in a range of about 1 to about 20 volume % based on the total volume inside the reactor. The rest may include inert gas. When the reduction gas is less than the predetermined amount, e.g., less than about 1 volume %, a desired reduction may not be appropriately obtained. When the reduction gas is greater than the predetermined amount, e.g., greater than about 20 volume %, surface-treating time may be shortened, but a process cost may be increased.

The reduction step may be performed through a heat treatment at a temperature of about 200 to about 500° C. for about 10 to about 50 minutes. When the temperature in the reduction step is less than the predetermined range, e.g., less than about 200° C., or the time of the reduction is less than the predetermined range, e.g., less than about 10 minutes, a reduction may not be appropriately obtained. When the temperature in the reduction step is greater than the predetermined range, e.g., greater than about 500° C., or the time is greater than the predetermined range, e.g., greater than about 50 minutes, pore characteristics of the activated carbon may be deteriorated.

After the reduction step, a step of cooling under an inert atmosphere may be further included.

Preferably, after the reduction step, the activated carbon may have an oxygen content of less than or equal to about 3.5 wt %. The oxygen content may be reduced to the above level to much improve gasoline vapor adsorption/desorption performance.

EXAMPLE

The following examples illustrate the present invention in more detail. However, the following examples show exemplary embodiments of the present invention, but do not limit it.

Experimental Example 1

Example 1

Wood chips were used as a wood activated carbon precursor. 10 g of the wood chips were put in a high temperature reactor and then, carbonized for 120 minutes to obtain 4 g of a carbonized material by charging nitrogen gas in the high temperature reactor to form a nitrogen atmosphere and heating the high temperature reactor up to a temperature of 700° C. at a temperature-increasing rate of 10° C./min.

Subsequently, the carbonized material was activated at a temperature of 900° C. for 10 minutes after converting the nitrogen atmosphere into an aqueous vapor atmosphere by supplying and internally charging the high temperature reactor with aqueous vapor at a speed of 0.5 ml/min, while the high temperature reactor was maintained at a temperature of 900° C. Then, the aqueous vapor atmosphere was converted into the nitrogen atmosphere by injecting nitrogen into the high temperature reactor, and the temperature of the high temperature reactor was increased up to a temperature of 1000° C. Then, carbon dioxide was supplied to the high temperature reactor at a speed of 200 ml/min and internally charged in the high temperature reactor to convert the nitrogen atmosphere into a carbon dioxide atmosphere, and then, porous carbon was activated at a temperature of 1000° C. for 20 minutes to obtain high performance activated carbon. Subsequently, nitrogen was supplied to the high temperature reactor to convert the atmosphere into nitrogen atmosphere, and the high temperature reactor was cooled down to room temperature.

Example 2

Activated carbon was prepared according to the same method as Example 1 except for performing a heat treatment at a temperature of 900° C. in a second activating step.

Comparative Example 1

Activated carbon was prepared according to the same method as Example 1 except for performing a heat treatment for 30 minutes during the first activating but no second activating.

Comparative Example 2

Activated carbon was prepared according to the same method as Example 1 except for performing no first activating but a heat treatment for 30 minutes during the second activating.

Comparative Example 3

First activating and second activating were simultaneously performed. In other words, aqueous vapor was supplied at a speed of 0.5 ml/min, and simultaneously, carbon dioxide was supplied at a speed of 200 ml/min. A heat treatment was performed at a temperature of 900° C. for 30 minutes. The rest of the processes except for the above was the same as Example 1.

Comparative Example 4

First activating and second activating were simultaneously performed. In other words, aqueous vapor was supplied at a speed of 0.5 ml/min, and simultaneously, carbon dioxide was supplied at a speed of 200 ml/min. A heat treatment was performed at a temperature of 1000° C. for 30 minutes. The rest of the processes except for the above was the same as Example 1.

Comparative Example 5

First activating and second activating were simultaneously performed. In other words, a heat treatment was performed at a temperature of 1000° C. for 10 minutes by supplying carbon dioxide at a speed of 200 ml/min, and then, another heat treatment was performed at a temperature of 1000° C. for 20 minutes by supplying aqueous vapor at a speed of 0.5 ml/min. The rest of the processes except for the above was the same as Example 1.

Comparative Example 6

After performing second activating first, a first activating was performed. In other words, a heat treatment was performed at a temperature of 1000° C. for 10 minutes by supplying carbon dioxide at a speed of 200 ml/min, and then, another heat treatment was performed at a temperature of 900° C. for 20 minutes by supplying aqueous vapor at a speed of 0.5 ml/min. The rest of the processes except for the above was the same as Example 1.

A yield, a specific surface area, a pore entire volume, a mesopore (a diameter of 2 nm to 50 nm) volume, and a micro pore (a diameter of less than 2 nm) volume of the activated carbons according to Examples 1 and 2 and Comparative Examples 1 to 6 were measured and are shown in Table 1.

Yield: a mass change of activated carbon relative to a precursor was measured as a percentage.

Specific surface area: calculated by measuring an adsorption amount of nitrogen ($N_2$) gas at 77K according to a relative pressure ($P/P_0$) with an isothermal adsorption device (BELSORP-max, BEL JAPAN, Japan) after deaerated for 6 hours at 573K, while a residual pressure was maintained to be less than or equal to $10^{-3}$ torr.

TABLE 1

|  | Yield (%) | $S_{BET}$ ($m^2/g$) | $V_{Total}$ ($cm^3/g$) | $V_{Meso}$ ($cm^3/g$) | $V_{Micro}$ ($cm^3/g$) |
| --- | --- | --- | --- | --- | --- |
| Example 1 | 15 | 2790 | 1.51 | 0.77 | 0.74 |
| Example 2 | 56 | 1700 | 0.73 | 0.09 | 0.64 |
| Comparative Example 1 | 15 | 2380 | 1.15 | 0.35 | 0.80 |
| Comparative Example 2 | 37 | 1810 | 0.76 | 0.09 | 0.67 |
| Comparative Example 3 | 17 | 2300 | 1.10 | 0.31 | 0.79 |
| Comparative Example 4 | 0 | — | — | — | — |
| Comparative Example 5 | 0 | — | — | — | — |
| Comparative Example 6 | 16 | 2330 | 1.10 | 0.31 | 0.79 |

As shown in Table 1, Example 1 where the heat-treating steps were separately and sequentially performed, for example, the first activating and second activating, showed the most excellent pore characteristics.

Example 2 showed insufficient pore characteristics compared with those of Example 1, because a temperature in the second activating was lower than that of Example 1. However, Example 2 showed a little higher yield than that of Example 1.

On the other hand, when a heat treatment was performed at a temperature of 1000° C. by using aqueous vapor, a yield was 0. When the activating was performed by using aqueous vapor at a temperature of 1000° C., the aqueous vapor had very strong oxidizing power and thus caused this result.

Figure 2:
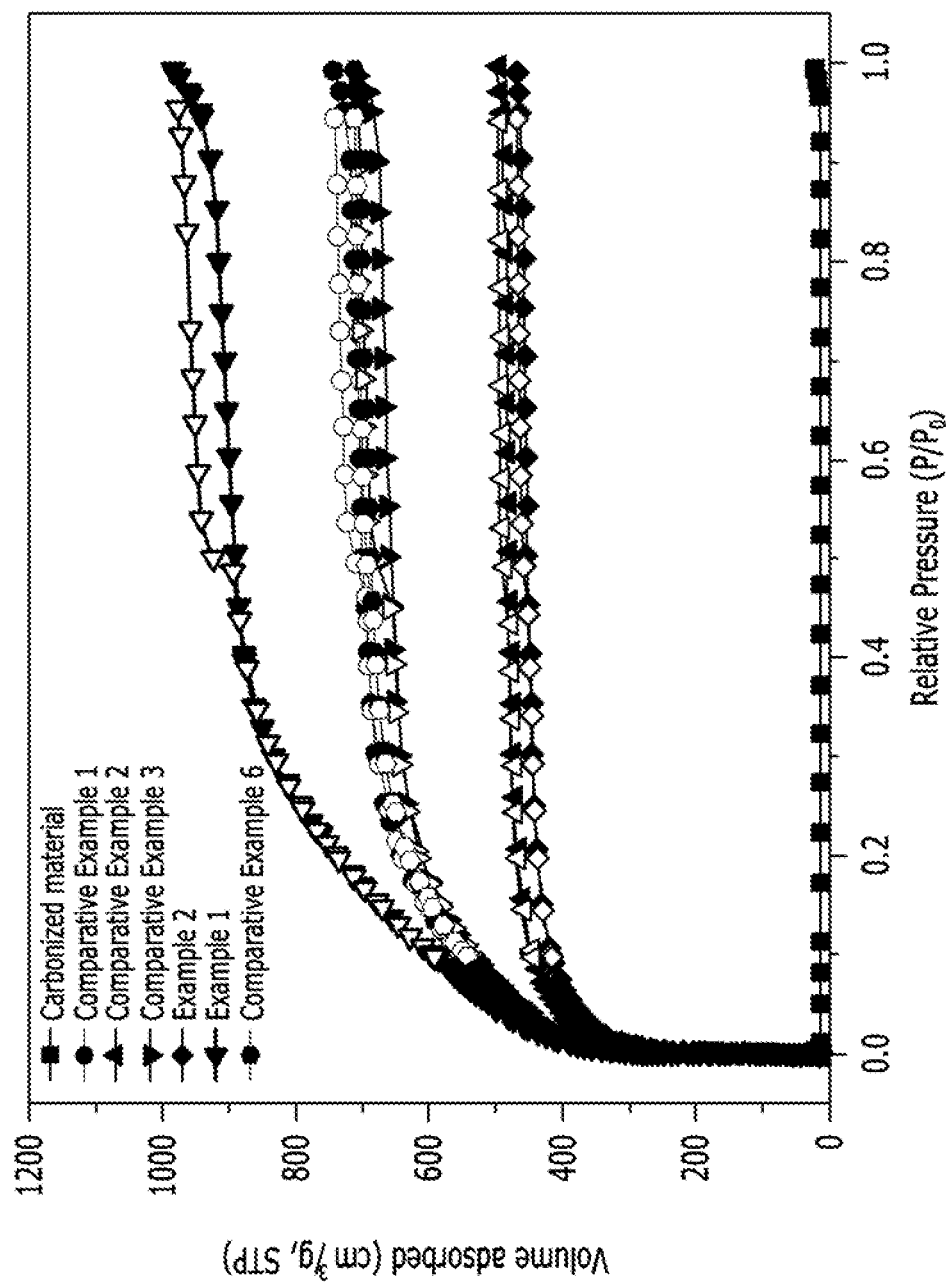
FIG. 2 shows a $N_2$/77K isothermal adsorption analysis result of an exemplary activated carbon according to an exemplary embodiment of the present invention.

FIG. 2 shows $N_2$/77K isothermal adsorption analysis results of the activated carbons according to Examples 1 and 2 and Comparative Examples 1 to 6. In addition, FIG. 3 shows volume analysis results of the activated carbons according to Example 1 and Comparative Examples 1 to 3 and 6 depending on a pore diameter.

Figure 3:
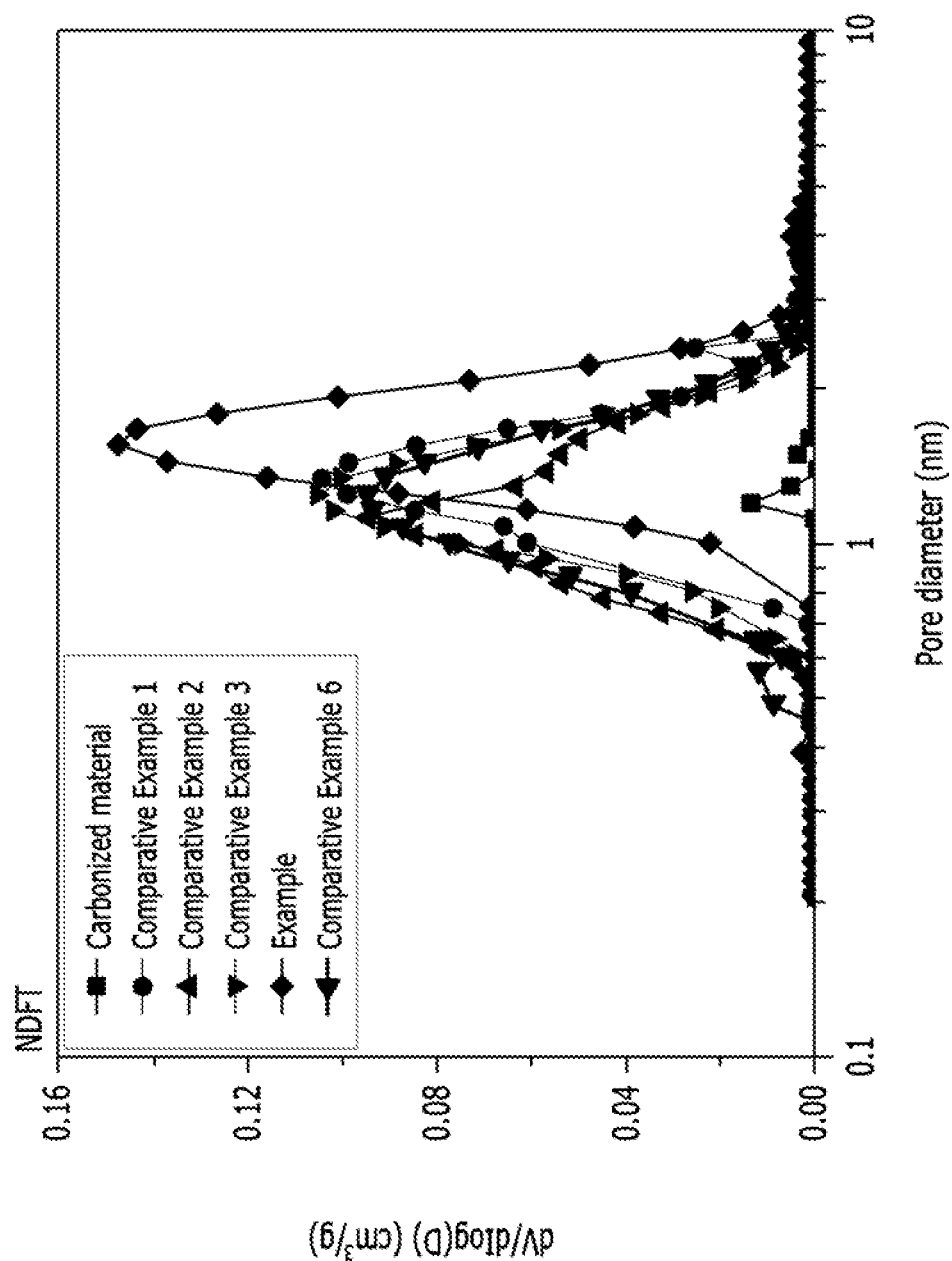
FIG. 3 shows a volume analysis result of an exemplary activated carbon depending on a pore diameter.

As shown in FIGS. 2 and 3, Example 1 showed the most excellent pore characteristics.

Experimental Example 2

Coconut shells or wood chips were used as a wood activated carbon precursor. 10 g of the activated carbon precursor was put in a high temperature reactor and then, carbonized for 120 minutes to obtain 4 g of a carbonized material by injecting and charging the nitrogen gas in the high temperature reactor to convert the atmosphere into a nitrogen atmosphere and heating the high temperature reactor up to a temperature of 700° C. at a temperature-increasing rate of 10° C./min.

Subsequently, the carbonized material was activated at a temperature of 900° C. by supplying the high temperature reactor with aqueous vapor at 0.5 ml/min to charge the high temperature reactor with the aqueous vapor and convert the atmosphere into an aqueous vapor atmosphere, while the high temperature reactor was maintained at a temperature of 900° C. Subsequently, the aqueous vapor atmosphere was converted into a nitrogen atmosphere by injecting nitrogen into the high temperature reactor, and the temperature thereof was increased up to a temperature of 1000° C. The high temperature reactor was supplied with carbon dioxide at a speed of 200 ml/min and charged with the carbon dioxide to convert the nitrogen atmosphere into a carbon dioxide atmosphere and then, activate porous carbon at a temperature of 1000° C. and obtain high performance activated carbon. Then, the high temperature reactor was supplied with nitrogen to convert the atmosphere into a nitrogen atmosphere, cooled down to a temperature of 400° C., and then, supplied and internally charged with hydrogen to convert the nitrogen atmosphere into a hydrogen atmosphere and thus reduce an oxygen functional group of carbon Subsequently, the high temperature was supplied with nitrogen to convert the hydrogen atmosphere into a nitrogen atmosphere, and then, the porous carbon was cooled down to room temperature to prepare about 2.8 g of high performance activated carbon as a final product.

Activated carbons were prepared by changing heat treatment time of each first activating and second activating step, and a yield, a specific surface area, BWC (butane working capacity), and an oxygen content of the activated carbons in each step were measured and shown in Tables 2 and 3.

BWC: BWC of each specimen was calculated in a 25° C. thermostat according to ASTM D5228.

Oxygen content: an oxygen content of each specimen was calculated by using X-ray photoelectron spectroscopy (XPS).

TABLE 2

|  |  | First activating | | | Second activating | | | | |
| --- | --- | --- | --- | --- | --- | --- | --- | --- | --- |
|  | Precursor | Time (min.) | Specific surface area ($m^2/g$) | BWC (G/dL) | Time (min.) | yield (%) | Specific surface area ($m^2/g$) | BWC (G/dL) | Oxygen content (wt %) |
| Example 3 | Coconut shell | 20 | 1380 | 3.7 | 20 | 70 | 1630 | 6.5 | 15.1 |
| Example 4 | Coconut shell | 20 | 1380 | 3.7 | 40 | 61 | 2060 | 11 | 16.9 |
| Example 5 | Coconut shell | 20 | 1380 | 3.7 | 60 | 15 | 1520 | 5.8 | 17.8 |
| Example 6 | Coconut shell | 40 | 1850 | 8.5 | 20 | 65 | 1920 | 8.7 | 14.9 |

TABLE 2-continued

| | Precursor | First activating | | | Second activating | | | |
| --- | --- | --- | --- | --- | --- | --- | --- | --- |
| | | Time (min.) | Specific surface area (m²/g) | BWC (G/dL) | Time (min.) | yield (%) | Specific surface area (m²/g) | BWC (G/dL) | Oxygen content (wt %) |
| Example 7 | Coconut shell | 40 | 1850 | 8.5 | 40 | 42 | 2230 | 13.5 | 16.5 |
| Example 8 | Coconut shell | 40 | 1850 | 8.5 | 60 | 8 | 1750 | 8.8 | 18 |
| Example 9 | Wood chip | 20 | 1620 | 8.5 | 20 | 68 | 1830 | 9.4 | 15.5 |
| Example 10 | Wood chip | 20 | 1620 | 8.5 | 40 | 57 | 2280 | 13.5 | 16.3 |
| Example 11 | Wood chip | 20 | 1620 | 8.5 | 60 | 17 | 2200 | 11.2 | 17.5 |
| Example 12 | Wood chip | 40 | 2020 | 9.8 | 20 | 63 | 2180 | 11.3 | 15.1 |
| Example 13 | Wood chip | 40 | 2020 | 9.8 | 40 | 55 | 2450 | 14.1 | 16.8 |
| Example 14 | Wood chip | 40 | 2020 | 9.8 | 60 | 10 | 2340 | 13.7 | 17.8 |

TABLE 3

| | Reduction process | |
| --- | --- | --- |
| | Oxygen content (wt %) | BWC (g/dL) |
| Example 3 | 3.1 | 7.2 |
| Example 4 | 3 | 12 |
| Example 5 | 3.3 | 6.6 |
| Example 6 | 2.8 | 9.8 |
| Example 7 | 3.1 | 14.8 |
| Example 8 | 3.2 | 9.6 |
| Example 9 | 3.1 | 10.1 |
| Example 10 | 3 | 14.5 |
| Example 11 | 3.3 | 12.1 |
| Example 12 | 3.4 | 12.2 |
| Example 13 | 3.2 | 15.3 |
| Example 14 | 3.1 | 15.5 |

As shown in Tables 2 and 3, when wood chips were used as a precursor, excellent pore characteristics were obtained compared with those of coconut shells. In addition, Examples 7 and 13 performing primary activating and second activating for 40 minutes showed the most excellent pore characteristics. In addition, Examples 7 and 13 showed the most excellent BWC.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

What is claimed is:

1. A method for manufacturing an activated carbon, comprising
providing a carbon material in a reactor,
carbonizing the carbon material by a first heat-treating under an inert gas atmosphere,
first activating the carbonized carbon material by a second heat-treating under an oxidizing gas atmosphere,
second activating the first activated carbon material by a third heat-treating under a carbon dioxide atmosphere, and
cooling under an inert gas atmosphere.

2. The method of claim 1, wherein the carbon material is at least one selected from coal, starch, coconut shells, tangerine peels, orange peels, coffee grounds, bamboo stems, wood chips, petroleum-based pitch, coal-based pitch, a polyvinylidene-based polymer, a phenol-based polymer, a urethane-based polymer, and a polyacrylonitrile polymer.

3. The method of claim 1, wherein the first heat-treating is performed at a temperature of about 600° C. to about 1000° C. for about 1 hour to about 2 hours.

4. The method of claim 1, wherein a temperature-increasing rate during the first heat-treating ranges from about 0.5° C./min to about 10° C./min.

5. The method of claim 1, wherein after the carbonizing, the method further comprises increasing a temperature under an inert gas atmosphere.

6. The method of claim 1, wherein the second heat-treating is performed at a temperature of about 600° C. to about 1100° C. for about 10 to about 60 minutes.

7. The method of claim 1, wherein the oxidizing gas comprises at least one of steam and oxygen.

8. The method of claim 1, wherein the third heat-treating is performed at a temperature of about 900° C. to about 1200° C. for about 10 to about 60 minutes.

9. The method of claim 1, wherein the third heat-treating is performed at a temperature greater than a temperature of the second hear-treating by about 50° C. to about 300° C.

10. The method of claim 1, wherein after the second activating, the method further comprises a reduction process by a fourth heat-treatment under a reduction gas atmosphere.

11. The method of claim 10, wherein the fourth heat-treating is performed at a temperature of about 200° C. to about 500° C. for about 10 to about 50 minutes.

12. The method of claim 10, wherein the reduction gas comprises at least one of hydrogen and ammonia.

13. The method of claim 10, wherein the reduction gas is included in an amount of about 1 volume % to about 20 volume % of a total volume inside the reactor.

14. The method of claim 10, wherein after the reduction process, the activated carbon has an oxygen content of less than or equal to 3.5 wt % based on the total weight of the activated carbon.

* * * * *